United States Patent Office 3,483,003
Patented Dec. 9, 1969

3,483,003
INHIBITION OF MICROBIAL GROWTH IN ALDONIC ACID AND ALDONATE COMPOSITIONS
Jack Ziffer, Milwaukee, and Arthur S. Gaffney, Waukesha, Wis., assignors to Pabst Brewing Company, Milwaukee, Wis., a corporation of Delaware
No Drawing. Filed Apr. 19, 1965, Ser. No. 449,264
Int. Cl. A23l 3/34
U.S. Cl. 99—150      8 Claims

ABSTRACT OF THE DISCLOSURE

Highly concentrated solutions of aldonic acids, aldonates or mixtures thereof, are inhibited against microbial growth by the addition of acetic acid or propionic acid. The invention is especially useful with highly concentrated solutions of gluconic acid and gluconates containing a total dissolved solids of 50% to 90% by weight.

---

This invention relates to the inhibition of microbial growth in aldonic acid and aldonate compositions, and more particularly to the inhibition of microbial growth in aqueous solutions of gluconic acid and aqueous solutions of gluconates or gluconates and gluconic acid.

Gluconic acid is usually made commercially from glucose either by chemical oxidation or by fermentation processes. The free acid is usually sold as a 50% by weight solution in water. It is also possible to prepare aqueous solutions of various gluconates, such as, for example, sodium gluconate, potassium gluconate and/or ammonium gluconate, as well as aqueous solutions of such gluconates containing gluconic acid.

Aqueous solutions of gluconic acid and/or gluconates are subject to microbial growth and especially to mold growth caused by various microorganisms. Despite prior efforts to prevent microbial growth in gluconic acid solutions, the commercial solutions heretofore available have left much to be desired. In most instances they exhibit mold growth when allowed to stand around after being exposed to the atmosphere. Inhibitory agents, such as the chlorinated phenols, have been added to such solutions in an attempt to prevent the growth of microorganisms but the use of such agents is undesirable where the products are to be employed in applications that are likely to cause food contamination.

One of the objects of the present invention is to provide new and improved aldonic acid solutions and aldonic acid-aldonate solutions which are inhibited against microbial growth by the incorporation therein of an inhibitory substance that is not a food contaminant.

Another object of the invention is to provide new and improved gluconic acid and gluconic acid-gluconate liquid products which are inhibited against microbial growth by the incorporation therein of a substance that is not a food contaminant.

Still a further object of the invention is to provide a new and improved method for inhibiting solutions of aldonic acid, solutions of aldonates, and solutions of aldonic acids and aldonates against microbial growth.

A more specific object of the invention is to provide a new and improved method for inhibiting aqueous solutions of gluconic acid, aqueous solutions of gluconates, and aqueous solutions of gluconic acid and one or more gluconates against microbial growth. Other objects will appear hereinafter.

In accordance with the invention it has been found that aqueous solutions of aldonic acids, aqueous solutions of aldonates, and aqueous solutions of an aldonic acid and at least one aldonate can be inhibited against microbial growth by incorporating therewith a fraction of a percent by weight of acetic acid and/or propionic acid. Since neither of these substances in the amounts effective for the purpose of the invention is considered to be a food contaminant, the invention is especially advantageous in providing liquid products inhibited against microbial growth which are capable of being used not only for many industrial purposes but also in the food industry.

The effective dosage of acetic acid or propionic acid for the purpose of the invention is subject to some variation depending upon the concentration and pH of the particular solutions of aldonic acid, aldonate or aldonic acid-aldonate which is to be inhibited. In general, the amounts required are lower at the lower pH's and at higher concentrations. Normally the invention is especially useful in compositions containing an aldonic acid and having a pH within the range of 1 to 5.

Typical examples of compositions to which the invention is applicable are: (1) commercial gluconic acid solutions, e.g., a 50% by weight solution of gluconic acid in water; (2) mixtures of gluconic acid and sodium gluconate in water having a dissolved solids content of 50% to 90% by weight and a weight ratio of gluconic acid to gluconate within the range of 0.06:1 to 44:1 preferably 0.2:1 to 4:1; and (3) an aqueous solution of a gluconate, e.g., ammonium gluconate, sodium gluconate and/or potassium gluconate. A 50% by weight solution of gluconic acid in water has a pH of 1.2. The presence of sodium gluconate in conjunction with the gluconic acid increases the pH but in most cases the pH will not exceed 5 and will usually be within the range of 3 to 4. On the other hand, an aqueous solution of 23.7% by weight ammonium gluconate in water has a pH of 6.2. The addition of acetic acid and/or propionic acid will produce a drop in pH to some extent, depending upon the type of solution and the amount added. The advantages of the invention are especially significant when the pH of the composition to be inhibited is below or does not exceed 7.

In order to demonstrate the effectiveness of the invention a number of compositions comprising gluconic acid and/or gluconates were prepared. Various proportions of acetic acid or propionic acid were added to these compositions. Some of the compositions were inoculated with microorganisms recovered from gluconic acid, gluconic acid-sodium gluconate or ammonium gluconate solutions. Others were exposed to air without inoculation. The results were observed in comparison with the same compositions to which no acetic acid or propionic acid had been added.

Mixed *Aspergillus niger*, Penicillium sp., and Spicaria sp. mold growth recovered from gluconic acid solutions and mixed *Aspergillus niger* and Penicillium sp. mold growth recovered from gluconic acid-sodium gluconate and ammonium gluconate solutions were used for the preparation of the inoculum suspensions. The procedure followed in inoculating these tests was to suspend a total of four square centimeters of mold growth, the source and mixtures as indicated below, in 100 ml. of the same liquid composition being tested, blend the mixture in a Waring Blendor for 10 seconds and then use the suspension to inoculate the respective test solutions at a 1% rate.

| Source of Microbial Contaminants | Inoculum (sq. cm.) Per 100 ml. Suspension | | |
|---|---|---|---|
| | A | B | C |
| Gluconic acid, sodium gluconate solutions | 4 | 2 | 1 |
| Gluconic acid solutions | 0 | 2 | 2 |
| Ammonium gluconate solutions | 0 | 0 | 1 |

The results obtained are shown in the following examples in which (v./v.) means volume per total volume and (w./w.) means weight per total weight. In these examples the amount of microbial growth is indicated as increasing from 1 to 3, the growth indicated by the numeral 2 being greater than that indicated by 1 and the growth indicated by 3 being greater than that indicated by 2. No microbial growth is indicated by 0. Sodium gluconate equivalent means the total gluconic acid and gluconate content, calculated as sodium gluconate.

EXAMPLE 1

Acetic acid and propionic acid were added in varying concentrations to a solution of gluconic acid and sodium gluconate in water containing 26.3% gluconic acid and 60.7% sodium gluconate equivalent (gluconic acid:sodium gluconate ratio=0.84) having a pH of 3.6. The treated solutions were then held at 28° C. and examined periodically for microbial growth. As indicated by the data in the following Table I, the addition of acetic acid and propionic acid in excess of 0.01% to the gluconic acid-sodium gluconate liquid product prevented the development of microbial growth.

TABLE I

| Acid | Percent (v./v.) | Microbial growth after indicated days at 28° C. | | | |
|---|---|---|---|---|---|
| | | 0 | 10 | 22 | 30 | 47 |
| Acetic Acid | 0.00 | 0 | 3 | 3 | 3 | 3 |
| | 0.01 | 0 | 3 | 3 | 3 | 3 |
| | 0.09 | 0 | 0 | 0 | 0 | 0 |
| | 0.48 | 0 | 0 | 0 | 0 | 0 |
| | 0.91 | 0 | 0 | 0 | 0 | 0 |
| Propionic Acid | 0.00 | 0 | 3 | 3 | 3 | 3 |
| | 0.01 | 0 | 0 | 3 | 3 | 3 |
| | 0.09 | 0 | 0 | 0 | 0 | 0 |
| | 0.48 | 0 | 0 | 0 | 0 | 0 |
| | 0.91 | 0 | 0 | 0 | 0 | 0 |

EXAMPLE 2

Acetic acid and propionic acid were added in varying concentrations to a solution of gluconic acid and sodium gluconate in water containing 30.7% (w./w.) gluconic acid and 59.7% (w./w.) sodium gluconate equivalent (gluconic acid:sodium gluconate ratio=1.2) having a pH of 3.45. The treated solutions were prepared in duplicate, and one set was inoculated with a mixed suspension of fungi recovered from contaminated gluconic acid-sodium gluconate liquid solutions. The treated solutions were held at 28° C. and examined periodically for microbial growth. As indicated by the data in the following Tables II and II(A), the addition of acetic acid in excess of 0.05% or the addition of propionic acid in excess of 0.01% to the gluconic acid-sodium gluconate liquid product prevented the development of microbial growth.

TABLE II

| Acid | Percent (v./v.) | Microbial Growth After Indicated Days at 28° C. (Not inoculated) | | | | | | | | | | |
|---|---|---|---|---|---|---|---|---|---|---|---|---|
| | | 0 | 12 | 21 | 30 | 40 | 50 | 60 | 70 | 84 | 98 | 112 |
| Control | 0.00 | 0 | 1 | 1 | 2 | 2 | 2 | 2 | 2 | 2 | 2 | 2 |
| Acetic Acid | 0.001 | 0 | 1 | 1 | 1 | 1 | 1 | 1 | 1 | 2 | 2 | 2 |
| | 0.005 | 0 | 1 | 1 | 1 | 1 | 1 | 1 | 1 | 2 | 2 | 2 |
| | 0.01 | 0 | 1 | 1 | 1 | 1 | 1 | 1 | 1 | 2 | 2 | 2 |
| | 0.025 | 0 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.25 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| | 1.0 | 0 | 0 | 0 | 0 | 0 | 0 | 0 | 0 | 0 | 0 | 0 |
| | 2.0 | 0 | 0 | 0 | 0 | 0 | 0 | 0 | 0 | 0 | 0 | 0 |
| Propionic Acid | 0.001 | 0 | 1 | 1 | 2 | 2 | 2 | 2 | 2 | 2 | 2 | 2 |
| | 0.005 | 0 | 0 | 1 | 1 | 1 | 1 | 1 | 1 | 1 | 1 | 2 |
| | 0.01 | 0 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 | 0 |
| | 0.01 | 0 | 0 | 0 | 0 | 0 | 0 | 0 | 0 | 0 | 0 | 0 |
| | 0.25 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| | 1.0 | 0 | 0 | 0 | 0 | 0 | 0 | 0 | 0 | 0 | 0 | 0 |
| | 2.0 | 0 | 0 | 0 | 0 | 0 | 0 | 0 | 0 | 0 | 0 | 0 |

TABLE II(A)

| Acid | Percent (v./v.) | Microbial Growth After Indicated Days at 28° C. (Inoculated) | | | | | | | | | | |
|---|---|---|---|---|---|---|---|---|---|---|---|---|
| | | 0 | 12 | 21 | 30 | 40 | 50 | 60 | 70 | 84 | 98 | 112 |
| Control | 0.00 | 0 | 2 | 2 | 3 | 3 | 3 | 3 | 3 | 3 | 3 | 3 |
| Acetic Acid | 0.001 | 0 | 3 | 3 | 3 | 3 | 3 | 3 | 3 | 3 | 3 | 3 |
| | 0.005 | 0 | 2 | 2 | 3 | 3 | 3 | 3 | 3 | 3 | 3 | 3 |
| | 0.01 | 0 | 2 | 2 | 3 | 3 | 3 | 3 | 3 | 3 | 3 | 3 |
| | 0.025 | 0 | 1 | 1 | 1 | 1 | 2 | 2 | 2 | 2 | 2 | 2 |
| | 0.05 | 0 | 0 | 0 | 0 | 0 | 0 | 0 | 0 | 0 | 1 | 1 |
| | 0.1 | 0 | 0 | 0 | 0 | 0 | 0 | 0 | 0 | 0 | 0 | 0 |
| | 0.25 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| | 1.0 | 0 | 0 | 0 | 0 | 0 | 0 | 0 | 0 | 0 | 0 | 0 |
| | 2.0 | 0 | 0 | 0 | 0 | 0 | 0 | 0 | 0 | 0 | 0 | 0 |
| Propionic Acid | 0.001 | 0 | 3 | 3 | 3 | 3 | 3 | 3 | 3 | 3 | 3 | 3 |
| | 0.005 | 0 | 2 | 2 | 3 | 3 | 3 | 3 | 3 | 3 | 3 | 3 |
| | 0.01 | 0 | 0 | 0 | 0 | 0 | 0 | 0 | 0 | 0 | 0 | 1 |
| | 0.025 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.25 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| | 1.0 | 0 | 0 | 0 | 0 | 0 | 0 | 0 | 0 | 0 | 0 | 0 |
| | 2.0 | 0 | 0 | 0 | 0 | 0 | 0 | 0 | 0 | 0 | 0 | 0 |

EXAMPLE 3

Acetic acid and propionic acid were added in varying concentrations to a gluconic acid-sodium gluconate liquid product containing 33.0% (w./w.) gluconic acid and 60.2% (w./w.) sodium gluconate equivalent (gluconic acid:sodium gluconate ratio=1.4) having a pH of 3.3. The treated solutions were prepared in duplicate, and one set was inoculated with a mixed suspension of fungi recovered from contaminated gluconic acid-sodium gluconate liquid solutions. The treated solutions were held at 28° C. and examined periodically for microbial growth. As indicated by the data in the following Tables III and III(A), the addition of acetic acid in excess of 0.05% or the addition of propionic acid in excess of 0.025% to the gluconic acid-sodium gluconate liquid product prevented the development of microbial growth.

TABLE III

| Acid | Percent (v./v.) | Microbial Growth After Indicated Weeks at 28° C. (not inoculated) | | | | | | | | | | |
|---|---|---|---|---|---|---|---|---|---|---|---|---|
| | | 0 | 2 | 3 | 4 | 5 | 6 | 7 | 8 | 9 | 10 | 12 |
| Control | 0.00 | 0 | 1 | 2 | 2 | 2 | 2 | 2 | 2 | 2 | 2 | 2 |
| Acetic Acid | 0.025 | 0 | 1 | 2 | 2 | 2 | 2 | 2 | 2 | 2 | 2 | 2 |
| | 0.05 | 0 | 0 | 1 | 1 | 1 | 1 | 2 | 2 | 2 | 2 | 2 |
| | 0.075 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| Propionic Acid | 0.0025 | 0 | 0 | 0 | 0 | 0 | 0 | 0 | 0 | 0 | 0 | 0 |
| | 0.005 | 0 | 0 | 0 | 0 | 0 | 0 | 0 | 0 | 0 | 0 | 0 |
| | 0.0075 | 0 | 0 | 0 | 0 | 0 | 0 | 0 | 0 | 0 | 0 | 0 |
| | 0.01 | 0 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 | 0 |

TABLE III(A)

| Acid | Percent (v./v.) | Microbial Growth After Indicated Weeks at 28° C. (Inoculated) | | | | | | | | | | |
|---|---|---|---|---|---|---|---|---|---|---|---|---|
| | | 0 | 2 | 3 | 4 | 5 | 6 | 7 | 8 | 9 | 10 | 12 |
| Control | 0.00 | 0 | 2 | 2 | 2 | 2 | 2 | 2 | 2 | 2 | 2 | 2 |
| Acetic Acid | 0.025 | 0 | 2 | 2 | 2 | 2 | 2 | 2 | 2 | 2 | 2 | 2 |
| | 0.05 | 0 | 2 | 2 | 2 | 2 | 2 | 2 | 2 | 2 | 2 | 2 |
| | 0.075 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 | 2 | 2 |
| | 0.005 | 0 | 2 | 2 | 2 | 2 | 2 | 2 | 2 | 2 | 2 | 2 |
| | 0.0075 | 0 | 2 | 2 | 2 | 2 | 2 | 2 | 2 | 2 | 2 | 2 |
| | 0.01 | 0 | 2 | 2 | 2 | 2 | 2 | 2 | 2 | 2 | 2 | 2 |
| | 0.025 | 0 | 0 | 0 | 0 | 1 | 1 | 1 | 1 | 1 | 1 | 1 |
| | 0.05 | 0 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 | 0 |

EXAMPLE 4

Acetic acid and propionic acid were added in varying concentrations to a solution of gluconic acid and sodium gluconate in water containing 35.4% (w./w.) gluconic and 60.8% (w./w.) sodium gluconate equivalent (gluconic acid:sodium gluconate ratio=1.65) having a pH of 3.25. The treated solutions were prepared in duplicate, and one set was inoculated with a mixed suspension of fungi recovered from contaminated gluconic acid and gluconic acid-gluconate liquid solutions. The treated solutions were held at 28° C. and examined periodically for microbial growth. As indicated by the data in the following Tables IV and IV(A), the addition of acetic acid in excess of 0.025% or the addition of propionic acid in excess of 0.01% to the gluconic acid-sodium gluconate liquid product prevented the development of microbial growth.

TABLE IV

| Acid | Percent (v./v.) | Microbial Growth after Indicated Weeks at 28° C. (Not inoculated) | | | | | | | |
|---|---|---|---|---|---|---|---|---|---|
| | | 0 | 2 | 3 | 4 | 5 | 6 | 7 | 8 |
| Control | 0.00 | 0 | 0 | 0 | 3 | 3 | 3 | 3 | 3 |
| Acetic Acid | 0.025 | 0 | 0 | 0 | 0 | 0 | 0 | 0 | 0 |
| | 0.05 | 0 | 0 | 0 | 0 | 0 | 0 | 0 | 0 |
| | 0.075 | 0 | 0 | 0 | 0 | 0 | 0 | 0 | 0 |
| | 0.1 | 0 | 0 | 0 | 0 | 0 | 0 | 0 | 0 |
| | 0.15 | 0 | 0 | 0 | 0 | 0 | 0 | 0 | 0 |
| | 0.2 | 0 | 0 | 0 | 0 | 0 | 0 | 0 | 0 |
| | 0.3 | 0 | 0 | 0 | 0 | 0 | 0 | 0 | 0 |
| | 0.4 | 0 | 0 | 0 | 0 | 0 | 0 | 0 | 0 |
| | 0.5 | 0 | 0 | 0 | 0 | 0 | 0 | 0 | 0 |
| Propionic Acid | 0.0025 | 0 | 1 | 1 | 2 | 2 | 2 | 2 | 2 |
| | 0.005 | 0 | 0 | 0 | 0 | 0 | 0 | 0 | 0 |
| | 0.0075 | 0 | 0 | 0 | 0 | 0 | 0 | 0 | 0 |
| | 0.01 | 0 | 0 | 0 | 0 | 0 | 0 | 0 | 0 |
| | 0.025 | 0 | 0 | 0 | 0 | 0 | 0 | 0 | 0 |
| | 0.05 | 0 | 0 | 0 | 0 | 0 | 0 | 0 | 0 |
| | 0.075 | 0 | 0 | 0 | 0 | 0 | 0 | 0 | 0 |
| | 0.1 | 0 | 0 | 0 | 0 | 0 | 0 | 0 | 0 |
| | 0.2 | 0 | 0 | 0 | 0 | 0 | 0 | 0 | 0 |

TABLE IV(A)

| Acid | Percent (v./v.) | Microbial Growth after Indicated Weeks at 28° C. (Inoculated) | | | | | | | |
|---|---|---|---|---|---|---|---|---|---|
| | | 0 | 2 | 3 | 4 | 5 | 6 | 7 | 8 |
| Control | 0.00 | 0 | 2 | 2 | 2 | 2 | 2 | 2 | 2 |
| Acetic Acid | 0.025 | 0 | 1 | 2 | 2 | 2 | 2 | 2 | 2 |
| | 0.05 | 0 | 0 | 0 | 0 | 0 | 0 | 0 | 0 |
| | 0.075 | 0 | 0 | 0 | 0 | 0 | 0 | 0 | 0 |
| | 0.1 | 0 | 0 | 0 | 0 | 0 | 0 | 0 | 0 |
| | 0.15 | 0 | 0 | 0 | 0 | 0 | 0 | 0 | 0 |
| | 0.2 | 0 | 0 | 0 | 0 | 0 | 0 | 0 | 0 |
| | 0.3 | 0 | 0 | 0 | 0 | 0 | 0 | 0 | 0 |
| | 0.4 | 0 | 0 | 0 | 0 | 0 | 0 | 0 | 0 |
| | 0.5 | 0 | 0 | 0 | 0 | 0 | 0 | 0 | 0 |
| Propionic Acid | 0.0025 | 0 | 2 | 2 | 2 | 2 | 2 | 2 | 2 |
| | 0.005 | 0 | 1 | 1 | 2 | 2 | 2 | 2 | 2 |
| | 0.0075 | 0 | 0 | 1 | 2 | 2 | 2 | 2 | 2 |
| | 0.01 | 0 | 0 | 0 | 1 | 1 | 1 | 1 | 1 |
| | 0.025 | 0 | 0 | 0 | 0 | 0 | 0 | 0 | 0 |
| | 0.05 | 0 | 0 | 0 | 0 | 0 | 0 | 0 | 0 |
| | 0.075 | 0 | 0 | 0 | 0 | 0 | 0 | 0 | 0 |
| | 0.1 | 0 | 0 | 0 | 0 | 0 | 0 | 0 | 0 |
| | 0.2 | 0 | 0 | 0 | 0 | 0 | 0 | 0 | 0 |

EXAMPLE 5

Acetic acid and propionic acid were added in varying concentrations to a solution of gluconic acid and sodium gluconate in water containing 31.6% (w./w.) gluconic acid and 63.3% (w./w.) sodium gluconate equivalent (gluconic acid:sodium gluconate ratio=1.12 having a pH of 3.3. The treated solutions were prepared in duplicate, and one set was inoculated with a mixed suspension of fungi recovered from contaminated gluconic acid and gluconic acid-gluconate liquid solutions. The treated solutions were held at 28° C. and examined periodically for microbial growth. As indicated by the data in the following Tables V and V(A), the addition of acetic acid in excess of 0.075% or the addition of propionic acid in excess of 0.01% to the gluconic acid-sodium gluconate liquid product prevented the development of microbial growth.

TABLE V

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 2 | 3 | 3 | 3 | 3 | 3 | 3 | 3 | 3 |
| Acetic Acid | 0.025 | 0 | 2 | 2 | 2 | 2 | 2 | 2 | 2 | 2 | 2 |
| | 0.05 | 0 | 0 | 0 | 1 | 1 | 1 | 1 | 1 | 1 | 1 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 | 2 |
| | 0.005 | 0 | 2 | 2 | 2 | 2 | 2 | 2 | 2 | 2 | 2 |
| | 0.0075 | 0 | 1 | 2 | 2 | 2 | 2 | 2 | 2 | 2 | 2 |
| | 0.01 | 0 | 1 | 1 | 2 | 2 | 2 | 2 | 2 | 2 | 2 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

TABLE V(A)

| Acid | Percent (v./v.) | Microbial Growth after Indicated Weeks at 28° C. (Inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 2 | 2 | 2 | 2 | 2 | 2 | 2 | 2 | 2 |
| Acetic Acid | 0.025 | 0 | 2 | 2 | 2 | 2 | 2 | 2 | 2 | 2 | 2 |
| | 0.05 | 0 | 2 | 2 | 2 | 2 | 2 | 2 | 2 | 2 | 2 |
| | 0.075 | 0 | 0 | 1 | 1 | 2 | 2 | 2 | 2 | 2 | 2 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 | 2 |
| | 0.005 | 0 | 2 | 2 | 2 | 2 | 2 | 2 | 2 | 2 | 2 |
| | 0.0075 | 0 | 2 | 3 | 3 | 3 | 3 | 3 | 3 | 3 | 3 |
| | 0.01 | 0 | 2 | 2 | 2 | 2 | 2 | 2 | 2 | 2 | 2 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

EXAMPLE 6

Acetic acid and propionic acid were added in varying concentrations to a solution of gluconic acid and sodium gluconate in water containing 31.7% (w./w.) gluconic acid and 60.3% (w./w.) sodium gluconate equivalent (gluconic acid:sodium gluconate ratio=1.27) having a pH of 3.35. The treated solutions were prepared in duplicate, and one set was inoculated with a mixed suspension of fungi recovered from contaminated gluconic acid-sodium gluconate liquid solutions. The treated solutions were held at 28° C. and examined periodically for microbial growth. As indicated by the data in the following Tables VI and VI(A), the addition of acetic acid in excess of 0.075% or the addition of propionic acid in excess of 0.025% to the gluconic acid-sodium gluconate liquid product prevented the development of microbial growth.

TABLE VI

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 1 | 2 | 2 | 2 | 2 | 2 | 2 | 2 | 2 |
| Acetic Acid | 0.0025 | 0 | 0 | 1 | 2 | 2 | 2 | 2 | 2 | 2 | 2 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 0 | 1 | 2 | 2 | 2 | 2 | 2 | 2 | 2 |
| | 0.005 | 0 | 0 | 0 | 0 | 0 | 1 | 1 | 1 | 1 | 1 |
| | 0.0075 | 0 | 0 | 0 | 0 | 0 | 0 | 1 | 1 | 1 | 1 |
| | 0.01 | 0 | 0 | 0 | 0 | 0 | 0 | 0 | 0 | 1 | 1 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

TABLE VI(A)

| Acid | Percent (v./v.) | Microbial Growth after Indicated Weeks at 28° C. (Inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 2 | 2 | 2 | 2 | 2 | 2 | 2 | 2 | 2 |
| Acetic Acid | 0.0025 | 0 | 2 | 2 | 2 | 2 | 2 | 2 | 2 | 2 | 2 |
| | 0.05 | 0 | 2 | 2 | 2 | 2 | 2 | 2 | 2 | 2 | 2 |
| | 0.075 | 0 | 1 | 1 | 1 | 1 | 1 | 1 | 1 | 1 | 2 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 | 2 |
| | 0.005 | 0 | 2 | 2 | 2 | 2 | 2 | 2 | 2 | 2 | 2 |
| | 0.0075 | 0 | 2 | 2 | 2 | 2 | 2 | 2 | 2 | 2 | 2 |
| | 0.01 | 0 | 2 | 2 | 2 | 2 | 2 | 2 | 2 | 2 | 2 |
| | 0.025 | 0 | 0 | 0 | 0 | 1 | 1 | 1 | 1 | 2 | 2 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

EXAMPLE 7

Acetic acid and propionic acid were added in varying concentrations to a solution of gluconic acid and sodium gluconate in water containing 35.6% (w./w.) gluconic acid and 62.2% (w./w.) sodium gluconate equivalent (gluconic acid:sodium gluconate ratio=1.58) having a pH of 3.2. The treated solutions were prepared in duplicate, and one set was inoculated with a mixed suspension of fungi recovered from contaminated gluconic acid and gluconic acid-sodium gluconate liquid solutions. The treated solutions were held at 280° C. and examined periodically for microbial growth. As indicated by the data in the following Tables VII and VII(A), the addition of acetic acid in excess of 0.025% or the addition of propionic acid in excess of 0.01% to the gluconic acid-sodium gluconate liquid product prevented the development of microbial growth.

TABLE VII

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 0 | 0 | 0 | 0 | 0 | 0 | 0 | 0 | 0 |
| Acetic acid | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0075 | 0 | 0 | 0 | 0 | 0 | 0 | 0 | 0 | 0 | 0 |
| | 0.01 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |

TABLE VII(A)

| Acid | Percent (v./v.) | Microbial Growth after Indicated Weeks at 28° C. (Inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 3 | 3 | 3 | 3 | 3 | 3 | 3 | 3 | 3 |
| Acetic Acid | 0.025 | 0 | 2 | 2 | 2 | 2 | 2 | 2 | 2 | 2 | 2 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0075 | 0 | 2 | 3 | 3 | 3 | 3 | 3 | 3 | 3 | 3 |
| | 0.01 | 0 | 1 | 3 | 3 | 3 | 3 | 3 | 3 | 3 | 3 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |

EXAMPLE 8

Acetic acid and propionic acid were added in varying concentrations to an aqueous solution of gluconic acid and sodium gluconate containing 34.9% (w./w.) gluconic acid and 60.1% (w./w.) sodium gluconate equivalent (gluconic acid:sodium gluconate ratio=1.64) having a pH of 3.4. The treated solutions were prepared in duplicate, and one set was inoculated with a mixed suspension of fungi recovered from contaminated gluconic acid-sodium gluconate liquid solutions. The treated solutions were held at 28° C. and examined periodically for microbial growth. As indicated by the data in the following Tables VIII and VIII(A), the addition of acetic acid in the concentration of 0.025% or the addition of propionic acid in excess of 0.025% to the gluconic acid-sodium gluconate liquid product prevented the development of microbial growth.

TABLE VIII

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 2 | 2 | 2 | 2 | 2 | 3 | 3 | 3 | 3 |
| Acetic acid | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 0 | 1 | 2 | 2 | 2 | 2 | 2 | 2 | 2 |
| | 0.005 | 0 | 0 | 0 | 1 | 1 | 2 | 2 | 2 | 2 | 2 |
| | 0.0075 | 0 | 0 | 0 | 0 | 0 | 0 | 0 | 0 | 0 | 0 |
| | 0.01 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

TABLE VIII(A)

| Acid | Percent (v./v.) | Microbial Growth after Indicated Weeks at 28° C. (Inoculated) | | | | | | | | |
|---|---|---|---|---|---|---|---|---|---|---|
| | | 0 | 2 | 3 | 4 | 5 | 6 | 7 | 8 | 9 | 10 |
| Control | 0.00 | 0 | 2 | 2 | 2 | 2 | 2 | 2 | 2 | 2 | 2 |
| Acetic Acid | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 | 2 |
| | 0.005 | 0 | 2 | 2 | 2 | 2 | 2 | 2 | 2 | 2 | 2 |
| | 0.0075 | 0 | 0 | 2 | 2 | 2 | 2 | 2 | 3 | 3 | 3 |
| | 0.01 | 0 | 0 | 0 | 2 | 2 | 2 | 2 | 3 | 3 | 3 |
| | 0.025 | 0 | 0 | 0 | 1 | 2 | 2 | 2 | 3 | 3 | 3 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

EXAMPLE 9

Acetic acid and propionic acid were added in varying concentrations to an aqueous solution of gluconic acid and sodium gluconate containing 40.0% (w./w.) gluconic acid and 60.4% (w./w.) sodium gluconate equivalent (gluconic acid:sodium gluconate ratio=2.51) having a pH of 3.2. The treated solutions were prepared in duplicate, and one set was inoculated with a mixed suspension of fungi recovered from contaminated gluconic acid and gluconic acid-gluconate liquid solutions. The treated solutions were held at 28° C. and examined periodically for microbial growth. As indicated by the data in the following Tables IX and IX(A), the addition of acetic acid in excess of 0.025% or the addition of propionic acid in excess of 0.0075% to the gluconic acid-sodium gluconate liquid product prevented the development of microbial growth.

TABLE IX

| Acid | Percent (v./v.) | Microbial Growth after Indicated Weeks at 28° C. (Not inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.00 | 0 | 0 | 1 | 1 | 2 | 2 | 3 | 3 | 3 | 3 |
| Acetic Acid | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 0 | 0 | 0 | 0 | 2 | 3 | 3 | 3 | 3 |
| | 0.005 | 0 | 0 | 0 | 0 | 0 | 1 | 1 | 1 | 1 | 1 |
| | 0.0075 | 0 | 0 | 0 | 0 | 0 | 0 | 0 | 0 | 0 | 0 |
| | 0.01 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

TABLE IX(A)

| Acid | Percent (v./v.) | Microbial Growth after Indicated Weeks at 28° C. (inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.00 | 0 | 1 | 2 | 2 | 2 | 2 | 2 | 2 | 2 | 2 |
| Acetic Acid | 0.025 | 0 | 0 | 0 | 1 | 1 | 1 | 2 | 2 | 2 | 2 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 0 | 1 | 2 | 2 | 2 | 3 | 3 | 3 | 3 |
| | 0.005 | 0 | 0 | 1 | 2 | 2 | 2 | 2 | 2 | 2 | 2 |
| | 0.0075 | 0 | 0 | 0 | 1 | 1 | 2 | 2 | 2 | 2 | 2 |
| | 0.01 | 0 | 0 | 0 | 0 | 0 | 0 | 0 | 0 | 0 | 0 |
| | 0.025 | 0 | 0 | 0 | 0 | 0 | 0 | 0 | 0 | 0 | 0 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

EXAMPLE 10

Acetic acid (0.15%) and propionic acid (0.075%) were added to solutions containing the indicated sodium gluconate equivalent concentrations. The latter solutions were prepared from solutions of gluconic acid and sodium gluconate in water containing 34.9% (w./w.) gluconic acid and 61.0% (w./w.) sodium gluconate equivalent (gluconic acid:sodium gluconate ratio=1.2) having a pH of 3.2. A replicate control set of sodium gluconate solutions was also prepared without either organic acid. All solutions were inoculated with a mixed suspension of fungi recovered from contaminated gluconic acid and gluconic acid-gluconate liquid solutions. The treated solutions were held at 28° C. and examined periodically for microbial growth. As indicated by the data in the following Table X, 0.15% acetic acid prevented microbial growth on 50% and 60% sodium gluconate equivalent solutions and markedly reduced microbial growth at the lower gluconate concentrations. Propionic acid (0.075%) prevented microbial growth at all gluconate concentrations.

TABLE X

| Acid, Percent (v./v.) | Sodium Gluconate Equivalent, Percent (w./w.) | Microbial Growth after Indicated Weeks at 28° C. (All Solutions Inoculated) | | | | | | |
|---|---|---|---|---|---|---|---|---|
| | | 0 | 2 | 3 | 4 | 5 | 6 | 7 |
| Control, 0.0 | 5 | 0 | 3 | 3 | 3 | 3 | 3 | 3 |
| | 10 | 0 | 3 | 3 | 3 | 3 | 3 | 3 |
| | 20 | 0 | 3 | 3 | 3 | 3 | 3 | 3 |
| | 30 | 0 | 3 | 3 | 3 | 3 | 3 | 3 |
| | 40 | 0 | 3 | 3 | 3 | 3 | 3 | 3 |
| | 50 | 0 | 2 | 2 | 2 | 2 | 2 | 2 |
| | 60 | 0 | 2 | 2 | 2 | 2 | 3 | 3 |
| Acetic acid, 0.15 | 5 | 0 | 1 | 1 | 1 | 1 | 1 | 1 |
| | 10 | 0 | 1 | 1 | 1 | 1 | 1 | 1 |
| | 20 | 0 | 1 | 1 | 1 | 1 | 1 | 1 |
| | 30 | 0 | 1 | 1 | 1 | 1 | 1 | 1 |
| | 40 | 0 | 1 | 1 | 1 | 1 | 1 | 1 |
| | 50 | 0 | 0 | 0 | 0 | 0 | 0 | 0 |
| | 60 | 0 | 0 | 0 | 0 | 0 | 0 | 0 |
| Propionic acid, 0.075 | 5 | 0 | 0 | 0 | 0 | 0 | 0 | 0 |
| | 10 | 0 | 0 | 0 | 0 | 0 | 0 | 0 |
| | 20 | 0 | 0 | 0 | 0 | 0 | 0 | 0 |
| | 30 | 0 | 0 | 0 | 0 | 0 | 0 | 0 |
| | 40 | 0 | 0 | 0 | 0 | 0 | 0 | 0 |
| | 50 | 0 | 0 | 0 | 0 | 0 | 0 | 0 |
| | 60 | 0 | 0 | 0 | 0 | 0 | 0 | 0 |

EXAMPLE 11

Acetic acid (0.1%) was added to aqueous solutions containing the indicated sodium gluconate equivalent concentrations. The latter solutions were prepared from a gluconic acid-sodium gluconate liquid product containing 35.4% (w./w.) gluconic acid and 60.8% (w./w.) sodium gluconate equivalent (gluconic acid:sodium gluconate ratio=1.65) having a pH of 3.25. A replicate control sample of 60% (w./w.) sodium gluconate solution was also prepared without acetic acid. All solutions were inoculated with a mixed suspension of fungi recovered from contaminated gluconic acid and gluconic acid-gluconate liquid solutions. The treated solutions were held at 28° C. and examined periodically for microbial growth. As indicated by the data in the following Table XI, 0.1% acetic acid prevented microbial growth at all gluconate concentrations.

TABLE XI

| Acetic Acid, Percent (v./v.) | Sodium Gluconate Equivalent, Percent (w./w.) | Microbial Growth After Indicated Weeks at 28° C. (All Solutions Inoculated) | | | | | | |
|---|---|---|---|---|---|---|---|---|
| | | 0 | 2 | 3 | 4 | 5 | 6 | 7 |
| 0.0 | 60 | 0 | 1 | 2 | 2 | 2 | 2 | 2 |
| 0.1 | 60 | 0 | 0 | 0 | 0 | 0 | 0 | 0 |
| 0.1 | 65 | 0 | 0 | 0 | 0 | 0 | 0 | 0 |
| 0.1 | 70 | 0 | 0 | 0 | 0 | 0 | 0 | 0 |
| 0.1 | 75 | 0 | 0 | 0 | 0 | 0 | 0 | 0 |
| 0.1 | 80 | 0 | 0 | 0 | 0 | 0 | 0 | 0 |
| 0.1 | 85 | 0 | 0 | 0 | 0 | 0 | 0 | 0 |

EXAMPLE 12

Acetic acid and propionic acid were added in varying concentrations to a gluconic acid liquid product containing 50% (w./w.) gluconic acid in water having a pH of 1.2 which was purchased from Chas. Pfizer & Co., Inc. The treated solutions were prepared in duplicate, and one set was inoculated with a mixed suspension of fungi recovered from contaminated gluconic acid and gluconic acid-sodium gluconate liquid solutions. The treated solutions were held at 28° C. and examined periodically for microbial growth. As indicated by the data in the following Tables XII and XII(A), the addition of acetic acid in excess of 0.15% or the addition of propionic acid in excess of 0.025% to the gluconic acid liquid product prevented the development of microbial growth.

TABLE XII

| Acid | Percent (v./v.) | Microbial Growth after Indicated Weeks at 28° C. (Not inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.0 | 0 | 0 | 1 | 2 | 2 | 2 | 2 | 2 | 2 | 2 |
| Acetic Acid | 0.025 | 0 | 0 | 1 | 2 | 2 | 2 | 2 | 2 | 2 | 2 |
| | 0.05 | 0 | 0 | 1 | 1 | 1 | 1 | 1 | 1 | 1 | 1 |
| | 0.075 | 0 | 0 | 1 | 1 | 1 | 1 | 1 | 1 | 1 | 1 |
| | 0.1 | 0 | 0 | 0 | 1 | 1 | 1 | 1 | 1 | 1 | 1 |
| | 0.15 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 0 | 1 | 2 | 2 | 2 | 2 | 2 | 2 | 2 |
| | 0.005 | 0 | 0 | 1 | 2 | 2 | 2 | 2 | 2 | 2 | 2 |
| | 0.0075 | 0 | 0 | 1 | 2 | 2 | 2 | 2 | 2 | 2 | 2 |
| | 0.01 | 0 | 0 | 1 | 2 | 2 | 2 | 2 | 2 | 2 | 2 |
| | 0.025 | 0 | 0 | 0 | 0 | 0 | 0 | 0 | 0 | 0 | 1 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

TABLE XII(A)

| Acid | Percent (v./v.) | Microbial Growth after Indicated Weeks at 28° C. (Inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.00 | 0 | 0 | 1 | 2 | 2 | 2 | 2 | 2 | 2 | 2 |
| cetic Acid | 0.025 | 0 | 1 | 2 | 2 | 2 | 2 | 2 | 2 | 2 | 2 |
| | 0.05 | 0 | 1 | 1 | 1 | 1 | 1 | 1 | 1 | 1 | 1 |
| | 0.075 | 0 | 1 | 1 | 1 | 1 | 1 | 1 | 1 | 1 | 1 |
| | 0.1 | 0 | 0 | 0 | 0 | 1 | 1 | 1 | 1 | 1 | 1 |
| | 0.15 | 0 | 0 | 0 | 0 | 0 | 0 | 0 | 0 | 0 | 1 |
| | 0.2 | 0 | 0 | 0 | 0 | 0 | 0 | 0 | 0 | 0 | 0 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 1 | 2 | 2 | 2 | 2 | 2 | 2 | 2 | 2 |
| | 0.005 | 0 | 1 | 2 | 2 | 2 | 2 | 2 | 2 | 2 | 2 |
| | 0.0075 | 0 | 1 | 2 | 2 | 2 | 2 | 2 | 2 | 2 | 2 |
| | 0.01 | 0 | 1 | 2 | 2 | 2 | 2 | 2 | 2 | 2 | 2 |
| | 0.025 | 0 | 0 | 0 | 0 | 0 | 0 | 0 | 0 | 0 | 1 |
| | 0.05 | 0 | 0 | 0 | 0 | 0 | 0 | 0 | 0 | 0 | 0 |
| | 0.075 | 0 | 0 | 0 | 0 | 0 | 0 | 0 | 0 | 0 | 0 |
| | 0.1 | 0 | 0 | 0 | 0 | 0 | 0 | 0 | 0 | 0 | 0 |
| | 0.2 | 0 | 0 | 0 | 0 | 0 | 0 | 0 | 0 | 0 | 0 |

EXAMPLE 13

Acetic acid and propionic acid were added in varying concentrations to a gluconic acid liquid product containing 50% (w./w.) gluconic acid dissolved in water, having a pH of 1.2, and which was purchased from Chas. Pfizer & Co., Inc. The treated solutions were prepared in duplicate, and one set was inoculated with a mixed suspension of fungi recovered from contaminated gluconic acid and gluconic acid-gluconate liquid solutions. The treated solutions were held at 28° C. and examined periodically for microbial growth. As indicated by the data in the following Tables XIII and XIII(A), the addition of acetic acid in excess of 0.1% or the addition of propionic acid in excess of 0.025% to the gluconic acid liquid product prevented the development of microbial growth.

TABLE XIII

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 |
| Control | 0.00 | 0 | 2 | 2 | 2 | 2 | 2 | 2 | 2 | 2 |
| Acetic Acid | 0.025 | 0 | 2 | 2 | 2 | 2 | 2 | 2 | 2 | 2 |
| | 0.05 | 0 | 1 | 2 | 2 | 2 | 2 | 2 | 2 | 2 |
| | 0.075 | 0 | 1 | 1 | 1 | 1 | 1 | 1 | 1 | 1 |
| | 0.1 | 0 | 1 | 1 | 1 | 1 | 1 | 1 | 1 | 1 |
| | 0.15 | 0 | 0 | 0 | 0 | 0 | 0 | 0 | 0 | 0 |
| | 0.2 | 0 | 0 | 0 | 0 | 0 | 0 | 0 | 0 | 0 |
| | 0.3 | 0 | 0 | 0 | 0 | 0 | 0 | 0 | 0 | 0 |
| | 0.4 | 0 | 0 | 0 | 0 | 0 | 0 | 0 | 0 | 0 |
| | 0.5 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 |
| | 0.005 | 0 | 2 | 2 | 2 | 2 | 2 | 2 | 2 | 2 |
| | 0.0075 | 0 | 2 | 2 | 2 | 2 | 2 | 2 | 2 | 2 |
| | 0.01 | 0 | 2 | 2 | 2 | 2 | 2 | 2 | 2 | 2 |
| | 0.025 | 0 | 0 | 0 | 0 | 1 | 1 | 1 | 1 | 1 |
| | 0.05 | 0 | 0 | 0 | 0 | 0 | 0 | 0 | 0 | 0 |
| | 0.075 | 0 | 0 | 0 | 0 | 0 | 0 | 0 | 0 | 0 |
| | 0.1 | 0 | 0 | 0 | 0 | 0 | 0 | 0 | 0 | 0 |
| | 0.2 | 0 | 0 | 0 | 0 | 0 | 0 | 0 | 0 | 0 |

TABLE XIII(A)

| Acid | Percent (v./v.) | Microbial Growth after Indicated Weeks at 28° C. (Not inoculated) | | | | | | | | |
|---|---|---|---|---|---|---|---|---|---|---|
| | | 0 | 2 | 3 | 4 | 5 | 6 | 7 | 8 | 9 |
| Control | 0.00 | 0 | 2 | 2 | 3 | 3 | 3 | 3 | 3 | 3 |
| Acetic Acid | 0.025 | 0 | 2 | 2 | 2 | 2 | 2 | 2 | 2 | 2 |
| | 0.05 | 0 | 1 | 2 | 2 | 2 | 2 | 2 | 2 | 2 |
| | 0.075 | 0 | 1 | 1 | 1 | 1 | 1 | 1 | 1 | 1 |
| | 0.1 | 0 | 1 | 1 | 1 | 1 | 1 | 1 | 1 | 1 |
| | 0.15 | 0 | 0 | 0 | 0 | 0 | 0 | 0 | 0 | 0 |
| | 0.2 | 0 | 0 | 0 | 0 | 0 | 0 | 0 | 0 | 0 |
| | 0.3 | 0 | 0 | 0 | 0 | 0 | 0 | 0 | 0 | 0 |
| | 0.4 | 0 | 0 | 0 | 0 | 0 | 0 | 0 | 0 | 0 |
| | 0.5 | 0 | 0 | 0 | 0 | 0 | 0 | 0 | 0 | 0 |
| Propionic Acid | 0.0025 | 0 | 2 | 2 | 2 | 2 | 2 | 2 | 2 | 2 |
| | 0.005 | 0 | 2 | 2 | 2 | 2 | 2 | 2 | 2 | 2 |
| | 0.0075 | 0 | 2 | 2 | 2 | 2 | 2 | 2 | 2 | 2 |
| | 0.01 | 0 | 2 | 2 | 2 | 2 | 2 | 2 | 2 | 2 |
| | 0.025 | 0 | 0 | 0 | 0 | 1 | 1 | 1 | 1 | 1 |
| | 0.05 | 0 | 0 | 0 | 0 | 0 | 0 | 0 | 0 | 0 |
| | 0.075 | 0 | 0 | 0 | 0 | 0 | 0 | 0 | 0 | 0 |
| | 0.1 | 0 | 0 | 0 | 0 | 0 | 0 | 0 | 0 | 0 |
| | 0.2 | 0 | 0 | 0 | 0 | 0 | 0 | 0 | 0 | 0 |

EXAMPLE 14

Acetic acid and propionic acid were added in varying concentrations to an ammonium gluconate liquid product containing 23.7% (w./w.) ammonium gluconate dissolved in water, having a pH of 6.2. The treated solutions were prepared in duplicate, and one set was inoculated with a mixed suspension of fungi recovered from contaminated gluconic acid and gluconic acid-gluconate liquid solutions. The treated solutions were held at 28° C. and examined periodically for microbial growth. As indicated by the data in the following Tables XIV and XIV(A), the addition of acetic acid in excess of 0.2% or propionic acid in excess of 0.1% to the uninoculated ammonium gluconate solutions prevented the development of microbial growth. In the inoculated solutions, greater amounts were required to attain the desired inhibitory effect. In these tests the addition of the acetic acid or propionic acid reduced the initial pH from 6.2 to as low as 5.15.

TABLE XIV

| Acid | Percent (v./v.) | Microbial Growth after Indicated Weeks at 28° C. (Not inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.00 | 0 | 3 | 3 | 3 | 3 | 3 | 3 | 3 | 3 | 3 |
| Acetic Acid | 0.025 | 0 | 0 | 0 | 2 | 3 | 3 | 3 | 3 | 3 | 3 |
| | 0.05 | 0 | 3 | 3 | 3 | 3 | 3 | 3 | 3 | 3 | 3 |
| | 0.075 | 0 | 3 | 3 | 3 | 3 | 3 | 3 | 3 | 3 | 3 |
| | 0.1 | 0 | 3 | 3 | 3 | 3 | 3 | 3 | 3 | 3 | 3 |
| | 0.15 | 0 | 3 | 3 | 3 | 3 | 3 | 3 | 3 | 3 | 3 |
| | 0.2 | 0 | 3 | 3 | 3 | 3 | 3 | 3 | 3 | 3 | 3 |
| | 0.3 | 0 | 0 | 0 | 0 | 0 | 0 | 0 | 0 | 0 | 0 |
| | 0.4 | 0 | 0 | 0 | 0 | 0 | 0 | 0 | 0 | 0 | 0 |
| | 0.5 | 0 | 0 | 0 | 0 | 0 | 0 | 0 | 0 | 0 | 0 |
| Propionic Acid | 0.0025 | 0 | 3 | 3 | 3 | 3 | 3 | 3 | 3 | 3 | 3 |
| | 0.005 | 0 | 0 | 0 | 2 | 3 | 3 | 3 | 3 | 3 | 3 |
| | 0.0075 | 0 | 3 | 3 | 3 | 3 | 3 | 3 | 3 | 3 | 3 |
| | 0.01 | 0 | 0 | 0 | 2 | 2 | 3 | 3 | 3 | 3 | 3 |
| | 0.025 | 0 | 3 | 3 | 3 | 3 | 3 | 3 | 3 | 3 | 3 |
| | 0.05 | 0 | 3 | 3 | 3 | 3 | 3 | 3 | 3 | 3 | 3 |
| | 0.075 | 0 | 3 | 3 | 3 | 3 | 3 | 3 | 3 | 3 | 3 |
| | 0.1 | 0 | 1 | 3 | 3 | 3 | 3 | 3 | 3 | 3 | 3 |
| | 0.2 | 0 | 0 | 0 | 0 | 0 | 0 | 0 | 0 | 0 | 0 |

TABLE XIV(A)

| Acid | Percent (v./v.) | Microbial Growth after Indicated Weeks at 28° C. (Inoculated) | | | | | | | | | |
|---|---|---|---|---|---|---|---|---|---|---|---|
| | | 0 | 2 | 3 | 4 | 5 | 6 | 7 | 8 | 9 | 10 |
| Control | 0.00 | 0 | 3 | 3 | 3 | 3 | 3 | 3 | 3 | 3 | 3 |
| Acetic Acid | 0.025 | 0 | 3 | 3 | 3 | 3 | 3 | 3 | 3 | 3 | 3 |
| | 0.05 | 0 | 3 | 3 | 3 | 3 | 3 | 3 | 3 | 3 | 3 |
| | 0.075 | 0 | 3 | 3 | 3 | 3 | 3 | 3 | 3 | 3 | 3 |
| | 0.1 | 0 | 3 | 3 | 3 | 3 | 3 | 3 | 3 | 3 | 3 |
| | 0.15 | 0 | 3 | 3 | 3 | 3 | 3 | 3 | 3 | 3 | 3 |
| | 0.2 | 0 | 3 | 3 | 3 | 3 | 3 | 3 | 3 | 3 | 3 |
| | 0.3 | 0 | 2 | 3 | 3 | 3 | 3 | 3 | 3 | 3 | 3 |
| | 0.4 | 0 | 2 | 3 | 3 | 3 | 3 | 3 | 3 | 3 | 3 |
| | 0.5 | 0 | 0 | 0 | 0 | 0 | 0 | 0 | 0 | 0 | 0 |
| Propionic Acid | 0.0025 | 0 | 3 | 3 | 3 | 3 | 3 | 3 | 3 | 3 | 3 |
| | 0.005 | 0 | 3 | 3 | 3 | 3 | 3 | 3 | 3 | 3 | 3 |
| | 0.0075 | 0 | 3 | 3 | 3 | 3 | 3 | 3 | 3 | 3 | 3 |
| | 0.01 | 0 | 3 | 3 | 3 | 3 | 3 | 3 | 3 | 3 | 3 |
| | 0.025 | 0 | 3 | 3 | 3 | 3 | 3 | 3 | 3 | 3 | 3 |
| | 0.05 | 0 | 3 | 3 | 3 | 3 | 3 | 3 | 3 | 3 | 3 |
| | 0.075 | 0 | 3 | 3 | 3 | 3 | 3 | 3 | 3 | 3 | 3 |
| | 0.1 | 0 | 3 | 3 | 3 | 3 | 3 | 3 | 3 | 3 | 3 |
| | 0.2 | 0 | 0 | 0 | 2 | 3 | 3 | 3 | 3 | 3 | 3 |

EXAMPLE 15

Compositions of acetic acid, gluconic acid-sodium gluconate, and sodium gluconate were prepared by the addition of acetic acid and sodium hydroxide to an aqueous gluconic acid-sodium gluconate liquid product containing 29.3% (w./w.) gluconic acid and 49.2% (w./w.) sodium gluconate equivalent (gluconic acid:sodium gluconate ratio=1.75) having a pH of 3.3. In all cases, the final solutions after the addition of the acetic acid and sodium hydroxide contained 37% (w./w.) sodium gluconate equivalent and had the adjusted pH values shown below.

| | A | B | C | D | E |
|---|---|---|---|---|---|
| Solution, pH | 3.3 | 4 | 5 | 6 | 7 |
| Sodium gluconate equivalent, percent (w./w.) | 37 | 37 | 37 | 37 | 37 |
| Gluconic acid, percent (w./w.) | 22.0 | 10.2 | 1.9 | 0 | 0 |
| Ratio gluconic acid:sodium gluconate | 1.75 | 0.40 | 0.05 | | |

A replicate control set of samples were also prepared without the addition of acetic acid. All solutions were inoculated with a mixed suspension of fungi recovered from contaminated gluconic acid and gluconic acid-gluconate liquid solutions. The treated solutions were held at 28° C. and examined at the end of two weeks for microbial growth. As indicated by the data in the following Table XV, the addition of acetic acid prevented microbial growth and the effective acetic acid concentration was a function of the particular solution pH.

TABLE XV

| Acetic Acid, percent (v./v.) | A | B | C | C | E |
|---|---|---|---|---|---|
| 0.0 | 2 | 2 | 2 | 2 | 2 |
| 0.1 | 2 | 2 | 2 | 2 | 2 |
| 0.2 | 0 | 0 | 1 | 2 | 2 |
| 0.4 | 0 | 0 | 0 | 1 | 2 |
| 0.6 | 0 | 0 | 0 | 0 | 1 |
| 0.8 | 0 | 0 | 0 | 0 | 0 |
| 1.0 | 0 | 0 | 0 | 0 | 0 |

From the foregoing examples it will be seen that the invention is effective over a wide range of proportions and concentrations. Thus, Examples 1 to 9 cover aqueous solutions of gluconic acid and sodium gluconate in various proportions within the range of 0.84 to 2.51 (weight ratio of gluconic acid to sodium gluconate) at a dissolved solids concentration of 60% (w./w.) sodium gluconate equivalent. Examples 10 and 11 cover tests carried out with liquid products containing 5-85% sodium gluconate equivalent. Examples 12 and 13 involve the treatment of commercial gluconic acid solutions. Example 14 is directed toward the treatment of an ammonium gluconate solution. Example 15 shows the treatment of solutions of sodium gluconate as well as those containing gluconic acid and sodium gluconate.

From these examples it is apparent that acetic acid and propionic acid are very effective in inhibiting microbial growth in aqueous solutions of an aldonic acid and/or an aldonate, more particularly gluconic acid and gluconates (e.g., sodium gluconate, potassium gluconate and/or ammonium gluconate) and mixtures thereof. Other aldonic acids and aldonates to which the invention is applicable are arabonic acid, mannonic acid, gulonic acid, galactonic acid and talonic acid, their salts, and mixtures of the acid and salts.

Many different substances have been employed heretofore in an effort to inhibit microbial growth in solutions of aldonic acids such as gluconic acid solutions. For the most part chlorinated phenols have been recommended and are said to be effective in inhibiting the growth of mold in gluconic acid solutions. Calcium and sodium propionate are known to afford protection against mold and rope in some foods such as bread. However, the use of acetic acid or propionic acid for this purpose has not been recommended. Nor has it been recognized heretofore that small amounts of acetic acid or propionic acid would be effective in preventing the growth of microorganisms in acidic media containing aldonic acids. Since aldonic acids such as gluconic acid are made by fermentation process it is difficult to avoid contamination by various micoorganisms which later grow and produce contaminating growths in the product. A particular advantage of the present invention resides in the fact that the effective inhibitory substances, viz., acetic acid and propionic acid, are permitted in foods. Another special advantage of the invention is that the acetic acid and propionic acid are effective inhibitors of micorbial growth in low dosages in solutions of aldonic acids and/or aldonates when the dissolved solids content is at least 50% by weight or more.

For practical purposes the dosage of the inhibitory acetic acid or propionic acid is usually within range of 0.1 to 1.% (v./v.) but, as the examples show, dosages as low as 0.01% (v./v.) or even 0.005% (v./v.) are effective in certain solutions.

In other solutions, such as those of Example 15, higher dosages are required, particularly where the pH is above 5. Thus, sodium gluconate solutions (37% w./w.) having a pH of 6 and of 7 required the use of 0.6% and 0.8% acetic acid (v./v.), respectively, in order to completely prevent microbial growth over a period of two weeks. These quantities are so small that they do not normally affect the use of the resultant products in washing solutions or for other purposes. Hence, the products are especially useful in all types of washing and cleaning solutions, e.g. bottle washing solutions containing caustic soda.

The invention is hereby claimed as follows:

1. A liquid composition consisting essentially of water and at least 50% by weight dissolved solids of a substance from the group consisting of gluconic acid, a gluconate and mixtures of gluconic acid and at least one gluconate, said composition being normally susceptible to microbial growth, and a microbial growth inhibiting amount of a substance from the class consisting of acetic acid and propionic acid.

2. An aqueous at least 50% by weight gluconic acid solution containing a fraction of one percent by weight of acetic acid sufficient to inhibit microbial growth in said solution.

3. An aqueous at least 50% by weight gluconic acid solution containing a fraction of one percent by weight of propionic acid sufficient to inhibit microbial growth in said solution.

4. A liquid composition having a dissolved solids content of at least 50% by weight and consisting essentially of a mixture of gluconic acid and gluconate in water, the weight ratio of said gluconic acid to said gluconate being within the range of 0.06:1 to 44:1, and a microbial growth inhibiting amount of a substance from the class consisting of acetic acid and propionic acid.

5. A liquid composition having a dissolved solids content of at least 50% by weight and consisting essentially of a mixture of gluconic acid and sodium gluconate in water, said composition containing gluconic acid and sodium gluconate in a weight ratio of at least 0.2:1 and being inhibited against microbial growth by addition thereto of acetic acid in a microbial growth inhibiting amount which is at least 0.01% by volume of acetic acid calculated on the volume of said composition.

6. A liquid composition having a dissolved solids content of at least 50% by weight and consisting essentially of a mixture of gluconic acid and sodium gluconate in water, said composition containing gluconic acid and sodium gluconate in a weight ratio of at least 0.2:1 and being inhibited against microbial growth by addition thereto of propionic acid in a microbial growth inhibiting amount which is at least 0.005% by volume of propionic acid calculated on the volume of said composition.

7. A liquid composition having a dissolved solids content of 50% to 90% by weight and consisting essentially of a mixture of gluconic acid and at least one gluconate in water, said composition containing gluconic acid and said gluconate in a weight ratio of 0.2:1 to 4:1 and being inhibited against microbial growth by the addition thereto of a microbial inhibiting amount of acetic acid which is a fraction of a percent by volume of acetic acid calculated on the volume of said composition.

8. A liquid composition having a dissolved solids content of 50% to 90% by weight and consisting essentially of a mixture of gluconic acid and at least one gluconate in water, said composition containing gluconic acid and said gluconate in a weight ratio of 0.2:1 to 4:1 and being inhibited against microbial growth by the addition thereto of a microbial inhibiting amount of propionic acid which is a fracton of a percent by volume of propionic acid calculated on the volume of said composition.

References Cited
FOREIGN PATENTS 370,039    4/1932    Great Britain.

OTHER REFERENCES

Levine et al.: "Journal of Bacteriology," vol. 39, 1940, pp. 499–515; pages 499, 512 and 513 relied on.

MAURICE W. GREENSTEIN, Primary Examiner

U.S. Cl. X.R.

99—224

PO-1050
(5/69)

UNITED STATES PATENT OFFICE
CERTIFICATE OF CORRECTION

Patent No. 3,483,003      Dated December 9, 1969

Inventor(s) Jack Ziffer et al

It is certified that error appears in the above-identified patent and that said Letters Patent are hereby corrected as shown below:

Column 7, line 26, "gluconic" should read --(gluconic--;
      line 31, "280°" should read "28°".

Column 13, line 67, "equivalent" should read --equivalent.--.

Column 14, line 29, "micorbial" should read --microbial--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,483,003          Dated December 9, 1969

Inventor(s) Jack Ziffer et al

It is certified that error appears in the above-identified patent and that said Letters Patent are hereby corrected as shown below:

Column 7, line 26, "gluconic" should read --(gluconic--;
      line 31, "280°" should read "28°".

Column 13, line 67, "equivalent" should read --equivalent.--.

Column 14, line 29, "micorbial" should read --microbial--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents